Jan. 7, 1941. M. PIER ET AL 2,227,672
THERMAL TREATMENT OF CARBONACEOUS MATERIALS WITH SUITABLE CATALYSTS
Filed Nov. 29, 1937
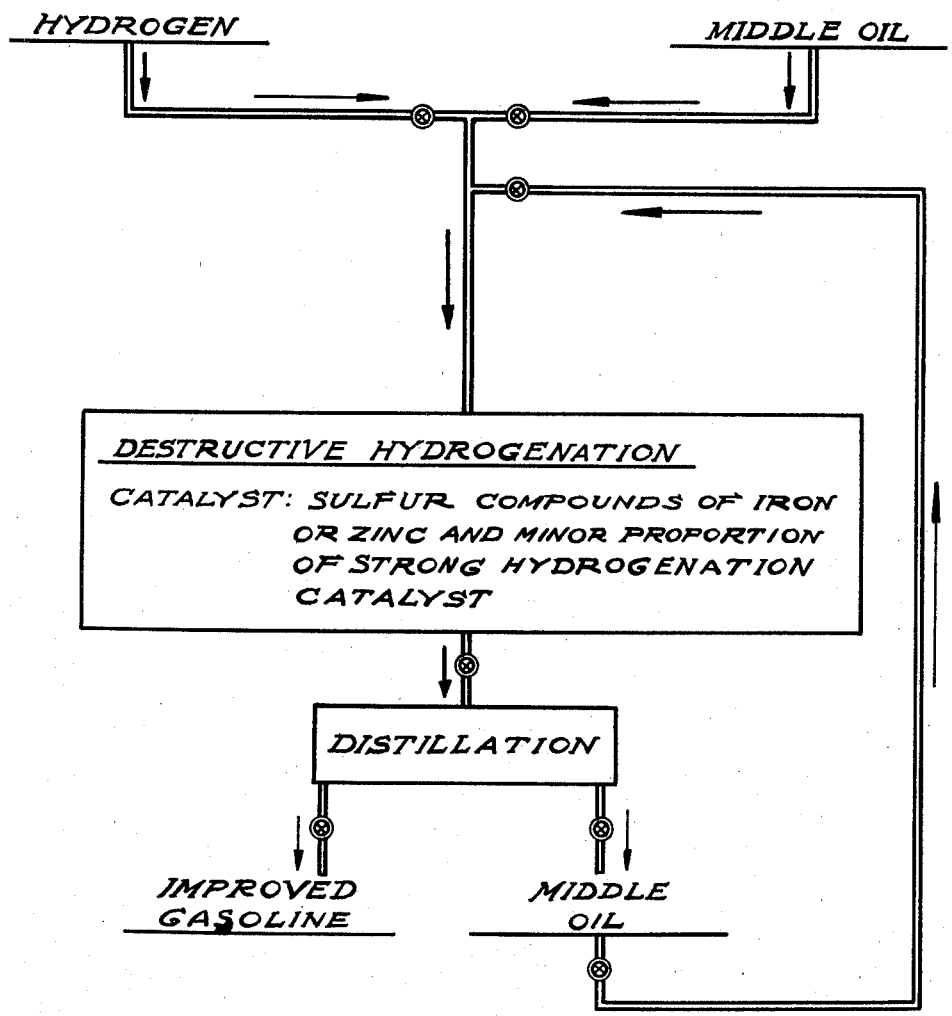
Mathias Pier
Walter Simon
Paul Jacob
Rudolf Becker
Inventors
By P. L. Young Attorney Patented Jan. 7, 1941

2,227,672

UNITED STATES PATENT OFFICE 2,227,672

THERMAL TREATMENT OF CARBONACEOUS MATERIALS WITH SUITABLE CATALYSTS

Mathias Pier, Heidelberg, and Walter Simon, Paul Jacob, and Rudolf Becker, Ludwigshafen-on-the-Rhine, Germany, assignors to Standard-I. G. Company, Linden, N. J., a corporation of Delaware Application November 29, 1937, Serial No. 177,086 In Germany November 30, 1936

13 Claims. (Cl. 196—53)

The present invention relates to the production or improvement of liquid or fusible hydrocarbons such as benzines, solvents, diesel oil, fuel oil, lubricating oil or paraffin wax, or hydrocarbon gases by subjecting carbonaceous materials containing more than one carbon atom in their molecule to a thermal treatment involving in the molecule of the initial material or part of the initial material a disruption of carbon-carbon bonds or of bonds connecting carbon with other elements or the removal of asphalts or resins or substances forming these.

The invention will be understood from the following description, taken in connection with the accompanying drawing, in which the figure is a diagrammatic sketch of an apparatus for carrying out the process.

It has been proposed in our U. S. application Serial No. 111,858 filed November 20, 1936 to split off atoms or atom-groups from products obtained by heat treatment of bituminous material using as catalysts sulphides having a comparatively weak hydrogenation action together with smaller amounts of sulphides having a stronger hydrogenating action.

We have now found that in the above said process particular advantages are attained by working in contact with catalysts comprising a mixture and/or chemical compound of a component $a$ consisting of one or more metals of weakly hydrogenating character having an atomic number between 25 and 30 in the form of preformed sulphur compounds, in particular preformed sulphides, and/or of compounds of phosphorus, in particular phosphates (the phosphate of zinc employed always being a neutral phosphate) with a component $b$ consisting of one or more metals of strongly hydrogenating character having an atomic number of at least 42 of groups 4 to 7 of the periodic system, or vanadium, chromium, nickel or cobalt or compounds thereof, the amount by weight of component $a$ in the catalyst being greater than the amount by weight of component $b$.

Usually the ratio of the weight of component $a$ to the weight of component $b$ in accordance with the present invention is at least 51:49, and preferably between 55:45 and 99.5:0.5.

The proportion of component $b$ in the catalysts in accordance with the present invention is in most cases not below 3 parts by weight to 97 parts of component $a$. Preferably the catalyst contains between 3 and 40 parts by weight of component $b$ relative to 97 to 60 parts by weight of component $a$. Very often between 15 and 30 parts, say 20 parts of component $b$ are employed in 100 parts of the mixture of $a$ and $b$. The specific proportions of components $a$ and $b$ are selected in each case according to the materials to be treated, the results desired and the working conditions under which they are to be employed. The best proportions and conditions can, if necessary, be ascertained in preliminary tests.

The metals of weakly hydrogenating character having an order number between 25 and 30 are manganese (25), iron (26), copper (29) and zinc (30). The preformed sulphides of iron, manganese or of zinc are preferred constituents of component $a$. In cases where several sulphides of the metals of component $a$ exist, advantageously the lower sulphides are employed, for example, ferrous sulphide, cuprous sulphide, or manganous sulphide. Higher sulphides or polysulphides of the said metals may, however, also be employed, for example, ferric sulphide, ferrous-ferric sulphide, cupric sulphide, manganic sulphide and the like. As examples of other sulphur compounds of the said metals of component $a$ with which good results are obtainable may be mentioned ferrous sulphate, copper sulphate, zinc sulphate, manganese sulphate, or sulphites, thiosulphates, mercaptides of said metals or the like. In particular thiosalts of the said metals may be employed in this connection. Said thiosalts may be salts of thioacids of metals of component $b$ or of other metals. Most of these sulphur compounds are converted into sulphides under the reaction conditions. As phosphates usually the orthophosphates are employed but also other phosphates, for example, metaphosphates or pyrophosphates come into question when convenient. Other compounds of phosphorus which may be employed are phosphites or phosphides of the said metals.

The metals of strongly hydrogenating character having an order number of at least 42 of groups 4 to 7 of the periodic system (component $b$) are molybdenum (42), tin (50), tungsten (74), rhenium (75), and uranium (92) and these or the compounds thereof are preferred constituents of component $b$.

By preference the metals of component $b$ are employed in the form of their compounds, in particular, in the form of oxides, hydroxides, sulphides, sulphates, thioacids or salts thereof, mercaptides or other sulphur compounds, but good results are also attainable with halides, selenides, tellurides, phosphates, carbonates or salts of organic acids of the said metals.

In many cases both component $a$ and component b are employed in the form of preformed sulphides. Said preformed sulphides may be prepared for use according to the present invention in various ways. For example, the metals or metal oxides or hydroxides or other suitable metal compounds may be subjected to a sulphidizing treatment under conditions allowing of a thorough conversion, with sulphidizing agents such as hydrogen sulphide, sulphur, carbon disulphide, mercaptanes and the like. Another method is the precipitation of polysulphides from an aqueous solution, the said polysulphides being then, if desired, subjected to a heat treatment for conversion to lower sulphides. Also sulphides prepared by thermal decomposition of the corresponding thiosalts are very suitable. It may be of advantage to subject sulphides to a treatment with sulphidizing agents in order to remove the last traces of oxygen therefrom.

It is desirable that the various constituents of the catalyst should be present in an intimate state of admixture with one another.

The mixing of the constituents of the catalyst may be carried out in various ways, for example, mechanically. For example, the components a and b may be prepared separately and then mixed.

Often it will be preferable that the intimate mixture or compound of components a and b is obtained direct in the chemical preparation of the catalysts, for example, by simultaneous chemical conversion of a mixture or compound of components a and b or of rudiments thereof. Also several different constituents of component a and/or of component b or other catalysts comprising mixtures of strongly and weakly hydrogenating constituents may be prepared by said simultaneous conversion. Thus alloys containing the metal bases of components a and b in suitable proportions and which are in a finely divided state, for example, powder, filings or turnings may be sulphidized under energetic conditions to produce mixed sulphides. In this way powders, filings or turnings of molybdenum steels or tungsten steels can be converted into valuable mixed sulphide catalysts for use in accordance with the present invention.

Furthermore salts of a metal base of component a with a thio acid of a metal of component b may be decomposed to give mixtures of sulphides, but in this case as a rule further amounts of a constituent or rudiment of component a will have to be admixed before, during or after decomposition of the thiosalt to produce the catalysts employed in accordance with the present invention.

It is also of advantage in the production of said catalysts by simultaneous chemical conversion of the rudiments of the constituents thereof to employ as an initial material a mixture of the solutions of corresponding metal salts and to obtain catalyst mixtures in accordance with the present invention or mixtures of rudiments thereof by common precipitation. For example, solutions of the sulphates, halides, nitrates or acetates of iron, manganese, zinc or copper as rudiments of the weakly hydrogenating component a may be mixed in suitable proportions with solutions of the rudiments of the strongly hydrogenating component b, for example, with solutions of the salts of nickel or cobalt or of the thiosalts or halides of the metals of component b or solutions of the ammonium or alkali metal salts of the acids derived from the metals of component b, as for example chromic acid or molybdic acid, and the desired mixture may be precipitated therefrom. Again, mixtures of rudiments of components a and b may be dissolved in the proportions prescribed in accordance with the present invention in a suitable solvent and the intimate mixture of components a and b or rudiments thereof then precipitated with a suitable precipitant, for example ammonia, ammonium carbonate, ammonium sulphate, hydrogen sulphide, oxalic acid or salts of oxalic acid. If required, the mixed precipitate thus obtained is then converted into a catalyst in accordance with the present invention by a suitable treatment, for example, by sulphidizing. Prior to, during or after the said conversion other metals or metal compounds may be added in suitable proportions.

A good catalyst is, for example, obtained by mixing a solution of ferrous sulphate with a suitable proportion of ammonium thiomolybdate dissolved in such an amount of ammonium sulphide solution as will suffice to precipitate the iron, a precipitate of a mixture of iron sulphide and iron thiomolybdate being thus obtained. The said precipitate may be further sulphidized, if desired.

In like manner to a solution of ferric chloride a solution of ammonium tungstate in such an excess of ammonia as will suffice for the precipitation of the iron may be added. In this way a mixture of iron hydroxide and iron tungstate is obtained which is then converted by treatment with ammonium sulphide solution or with hydrogen sulphide at elevated temperatures into a mixture of sulphides.

Also by an addition of ammonium sulphide to solutions which contain on the one hand salts of iron, zinc, manganese or copper and on the other hand salts of nickel or cobalt in suitable proportions catalysts in accordance with the present invention can be obtained.

Another method of producing mixed catalysts in accordance with the present invention is to intimately mix in the prescribed proportion with a metal sulphide belonging to the group comprising component a, a mixture of strongly hydrogenating metal sulphides belonging to the group comprising component b which has been obtained by sulphidizing the corresponding metals or metal compounds in common. A catalyst thus produced often has a higher activity than a material obtained by a simple mixing of the same catalyst constituents in the same proportions.

A further method of producing highly active catalysts in accordance with the present invention is to impregnate a metal sulphide belonging to the group comprising the weakly hydrogenating component a with a solution of a suitable proportion of the strongly hydrogenating component b or a rudiment thereof.

Such catalysts can, for example, be produced by impregnating the sulphides of iron, zinc, manganese or copper or mixtures containing these with solutions of suitable proportions of component b or rudiments thereof, for example, the thiosalts or halides of metals of group 6 of the periodic system, or the ammonium or alkali metal salts of the acids or thioacids based on these metals or with solutions of compounds of nickel or cobalt, for example the halides, nitrates, acetates or sulphates. Said impregnation may be carried out by immersion of the sulphides of component a in or by spraying with the solution of component b or rudiments thereof. The catalyst is then dried and, if necessary, sulphidized by treatment with a gaseous or volatile sulphur compound or with sulphur vapor at elevated temperature and preferably elevated pressure. It may also be of advantage to provide component *a* with the necessary admixture of component *b* by contacting it with a colloidal solution of component *b* from which the latter is adsorbed.

Again component *a* may be contacted with a true solution of component *b* from which component *b* is then precipitated on to component *a* or in which component *b* is brought into a colloidal form and in this state adsorbed by component *a*.

The aforesaid methods of preparation in common of catalyst mixtures may also be employed for the production of other catalysts containing weakly hydrogenating constituents in admixture with a lesser proportion of strongly hydrogenating constituents.

Mixed catalysts in accordance with the present invention are also obtainable by common crystallization.

As an example of a chemical compound of component *a* with component *b*, which may be employed direct as a catalyst in accordance with the present invention, may be mentioned the salts of the metals *a* with the thioacids of metals *b*, for example, iron thiotungstate, zinc thiomolybdate which may be considered as compounds of the sulphides of the respective metals. As already indicated said thiosalts, however, usually contain too little of component *a* for the purposes of the present invention and therefore suitable amounts of components *a* must be intimately admixed therewith.

As typical examples of good catalyst mixtures for use in accordance with the present invention may be mentioned:

99 parts of ferrous sulphide +1 part of tungsten disulphide
90 parts of ferrous sulphide +10 parts of tungsten disulphide
80 parts of ferrous sulphide +20 parts of tungsten disulphide
75 parts of ferrous sulphide +25 parts of tungsten disulphide
55 parts of ferrous sulphide +45 parts of tungsten disulphide
85 parts of ferrous sulphide +15 parts of molybdenum disulphide
75 parts of ferrous sulphide +25 parts of molybdenum disulphide
55 parts of ferrous sulphide +45 parts of molybdenum disulphide
85 parts of ferrous sulphide +15 parts of a mixture of nickelous sulphide and tungsten disulphide
85 parts of manganous sulphide +15 parts of molybdenum disulphide
85 parts of manganous sulphide +15 parts of tungsten disulphide
75 parts of manganous sulphide +25 parts of tungsten disulphide
70 parts of manganous sulphide +30 parts of molybdenum disulphide
70 parts of zinc sulphide +30 parts of tungsten disulphide
70 parts of zinc sulphide +30 parts of molybdenum disulphide
60 parts of zinc sulphide +40 parts of tungsten disulphide
60 parts of zinc sulphide +40 parts of molybdenum disulphide
80 parts of ferrous sulphide +20 parts of cobaltous sulphide
80 parts of ferrous sulphide +20 parts of nickelous sulphide
75 parts of ferrous sulphide +25 parts of rhenium sulphide
95 parts of ferrous sulphide +5 parts of rhenium sulphide
55-75 parts of ferrous sulphide +45-25 parts of vanadium trisulphide
60 parts of copper phosphate+zinc phosphate (molecular proportions)+40 parts of molydbenum disulphide
60 parts of copper phosphate+zinc phosphate (molecular proportions)+40 parts of tungsten disulphide
70 parts of iron phosphate +30 parts of ammonium molybdate
60 parts of iron phosphate +40 parts of ammonium molybdate
90 parts of ferrous sulphide +10 parts of molybdic acid
70 parts of ferrous sulphide +30 parts of tungstic acid
80 parts of ferrous sulphide +20 parts of ammonium phosphomolybdate
A sulphidized alloy of 22.7 parts of tungsten+0.5 part of molybdenum+1.1 parts of nickel+1.4 parts of vanadium+rest iron
A sulphidized alloy of 6-7 parts of chromium+0.5 part of molybdenum+rest iron Often those of the said catalysts are employed consisting substantially entirely of a mixture of the components *a* and *b* in the proportions indicated (concentrated catalyst). However, it is sometimes of advantage to employ said catalysts supported by or in admixture with foraminous carriers (dilute catalysts), for example on active carbon, bleaching earth, such as the earth known as "Terrana," fuller's earth, Florida earth or diatomaceous earth. Advantageously the carriers are activated by suitable pretreatments. Pretreated active carbons are preferred carriers in the process according to the present invention, in particular, those activated by treatment with steam, for example, brown coal small coke treated with sulphuric acid and steam. Siliceous carriers such as bleaching earths are advantageously activated by treatment with hydrogen fluoride or fluorine.

It is also sometimes of advantage to treat the carriers, before or after deposition of the catalyst substance thereon with other acids, for example, hydrogen chloride, nitric acid, phosphoric acid, boric acid and the like, or with gases such as hydrogen, volatile sulphur compounds free from oxygen, halogens, oxides of carbon, hydrogen phosphide and the like, advantageously at elevated temperatures, and, if desired, under pressure.

The catalyst may be deposited on the carrier by precipitation, adsorption on to the carrier from a colloidal solution or from a colloidal solution prepared in situ, or by impregnation with a solution and subsequent drying or by other means. The constituents of components *a* and *b* or the rudiments thereof may be deposited on the carrier simultaneously or one after another. A chemical conversion such as sulphidation may follow, if required.

As examples of dilute catalysts in accordance with the present invention may be mentioned:
80 parts of active carbon + 12 parts of ferrous sulphide +
8 parts of tungsten disulphide
80 parts of bleaching earth + 16 parts of ferrous sulphide +
4 parts of chromic acid Also the catalyst may contain other components besides the specific proportions of components *a* and *b*. Thus they may be employed in admixture with other catalysts, for example, metals or metal compounds.

If carriers and/or other constituents are present in the catalyst besides the specified components *a* and *b* it is desirable that the sum of the weights of components *a* and *b* should not fall below 10 per cent of the total weight of catalyst. For example, carrier substances, if employed, are usually contained in the catalyst in proportions of between 20 and 90 per cent by weight, especially 40 to 85 per cent, say 50 to 80 per cent. In catalysts employed in accordance with the present invention containing besides components *a* and *b* also other constituents or carrier substances the amount of component *b* should preferably not be below 0.5 per cent by weight of the entire catalyst.

Metalloids such as sulphur or halogens, for example, iodine, bromine or chlorine, or compounds thereof, for example, the hydrides, or compounds of ammonium or carbon with these metalloids may be employed when desired and, as the case may be, in suitable proportions selected in accordance with the results in view, in combination with or in admixture with the said mixture of components a and b.

According to the requirements in the process in which it is applied, the catalyst may either be stationarily contained in the reaction space, or it may be finely dispersed in the materials to be treated, either before, during or after the heating up or during the course of the reaction. The amounts of dispersed catalyst employed vary according to requirements and may be, say up to 30 per cent by weight, for example, between 1 and 10 per cent by weight.

The stationary catalysts may be employed in the form of lumps of irregular shape or suitably in the form of shaped bodies. Thus the catalysts may be employed in the form of small cubes, cylinders, pellets, rings, stars, prisms, sieves, balls, stream-line bodies and the like. The shapes may, for example, be attained by pressing. The said catalyst may be placed irregularly or in regular arrangement in the reaction vessel, if desired, supported by sieves or like supporting means. Coarse or fine-grained material may also be supported on wire gauze, grates, or the like.

The mixed catalysts in accordance with the present invention may also be employed in the form of true or colloidal solutions in said thermal treatments and, if desired, solid carbonaceous initial materials may be impregnated therewith.

One of the most striking advantageous characteristics of the catalysts when employed in the processes in accordance with the present invention is the high measure in which they are resistant against loss of activity in the thermal treatment with hydrogen or in the cracking of carbonaceous materials containing or forming asphaltic or resinous substances.

Another advantage of the catalysts in accordance with the present invention is that in so far as they are employed in thermal treatments for the production of benzines, said benzines have high octane numbers. In fact, in many treatments the catalysts have a specific activity towards the formation of aromatic hydrocarbons or the maintenance of the aromatic character of the initial materials.

Apart from this the mixed catalysts in accordance with the present invention are usually cheaper than catalysts consisting of constituent b alone. Furthermore in many countries constituent a of which the catalyst in accordance with the present invention contains predominant amounts, is more readily available than component b, and it was therefore a surprising and welcome result that with this economy substantially the same or better results are attainable as when working with a catalyst consisting of component b only.

In at least one of the above-mentioned respects and usually also in other respects the catalysts in accordance with the present invention are better than catalysts consisting of component a or of component b alone or of mixtures of said components in proportions different from those herein specified.

Examples of treatments within the scope of the present invention will now be described more in detail.

The thermal treatments herein specified are usually carried out at temperatures within the range of 180° to 700° C., say 250° to 650° C., more especially 300° to 600° C. and most of the said thermal treatments are carried out at a temperature between 400° and 500° C.

For each particular thermal treatment the pressures suitable therefore are employed. Thus atmospheric pressure or elevated pressures, for example of 20, 50, 300, 500, 800, 1000 atmospheres or more may be employed as required. In those exceptional cases where reduced pressure is of advantage, this is employed.

The thermal treatments in accordance with the present invention, in which particularly remarkable advantages are obtained, are those carried out with an addition of hydrogen or of gases containing a sufficient amount of free hydrogen.

The amount of hydrogen maintained in the reaction space and hot parts connected therewith, if any, varies greatly with the nature of the particular initial materials treated or according to the result in view. In general 500, 600, 1000, 2000 cubic meters or more of hydrogen, measured under normal conditions of temperature and pressure, per ton of carbonaceous material treated may be used. The smallest amount of hydrogen employed per ton of carbonaceous material will be about 100 cubic meters of hydrogen and amounts of up to about 3000, 4000, 6000 or 8000 cubic meters or more may be employed in many cases.

The throughputs employed are usually between 0.2 and 1.5 kilograms per liter of reaction space per hour, but other throughputs may also be employed as the case may be.

Considerable advantages are obtained in accordance with the present invention in the destructive hydrogenation of carbonaceous materials such as coal of many varieties, including bituminous coal and lignite, other solid carbonaceous materials such as peat, shales and wood, but more particularly in the destructive hydrogenation of liquid or fusible carbonaceous materials, such as mineral oils, tars and the products of distillation, conversion, and extraction of such solid, liquid or fusible carbonaceous materials.

Another process in which the present invention may be applied is cracking, for example, the cracking of middle oils, gas oils or heavy oils. The catalysts may be finely dispersed in the initial material or the catalysts may be stationarily contained in the cracking space. Gases may be introduced, for example, as heating media, or protective agents. Thus cracking gases may be recycled, or hot natural gas or refinery gas or steam added. The addition of small amounts of hydrogen is also advantageous. The pressures employed may be substantially atmospheric or of the order of 20, 50, 70, 100 atmospheres or more.

The valuable properties of the catalysts employed in accordance with the present invention also become apparent when they are employed in dehydrogenation treatments. As initial materials for dehydrogenation in the first place benzines or fractions thereof come into question, but also higher boiling fractions of mineral oils, tars or products of pressure-extraction or destructive hydrogenation of coal, as, for example, middle oils or heavy oils and the like. Also in the dehydrogenation of hydroaromatic hydrocarbons, for example, hydrotoluenes, hydronaphthalenes or higher hydrogenated cyclic compounds, such as are obtainable by hydrogenation under suitable conditions of coal or tars, in particular of bituminous coal, the said catalysts in the requisite proportions are employed with advantage.

Said dehydrogenation may be carried out in the liquid or gas phase at temperatures of 200° to 700° C., if desired in the presence of steam or of gases such as nitrogen, carbon dioxide, but especially in the presence of hydrogen. It may be carried out at atmospheric or reduced pressure, preferably, however, at elevated pressure, for example, at 20, 50, 200 or more atmospheres. The catalyst is in this reaction either stationarily contained in the reaction space or added to the initial material in a finely divided condition.

A further particularly advantageous application of the present invention is the production of aromatic hydrocarbons or hydrocarbon mixtures rich in aromatic hydrocarbons by treatment at elevated temperatures of carbonaceous materials by dealkylation or isomerisation, preferably with added hydrogen (hydroforming). In said isomerisations straight-chain hydrocarbons may be converted into branched-chain hydrocarbons. The dealkylation is carried out in a similar manner as the dehydrogenation afore-described whereby side-chains are split off from higher benzene homologues or polynuclear compounds. The said catalysts may also be employed for splitting off the end radicals or radicals standing near the end of the molecules of hydrocarbons with long open chains, in which case hydrogen is also added with advantage. For said dealkylations and isomerisations the constituents of component b are advantageously metal oxides. Several of such reactions often proceed side by side.

The present invention is also useful for such reactions as the conversion with hydrogenating gases of cresol to phenol (in which case the main reaction proceeds according to the following type of reaction:

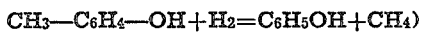
$$CH_3—C_6H_4—OH + H_2 = C_6H_5OH + CH_4)$$

A further advantageous application of the present invention is the reduction of phenols to the corresponding aromatic hydrocarbons.

Advantage may be taken in one and the same process of the different specific properties of concentrated catalyst applied in accordance with the present invention and of mixed catalyst in the proportions specified on a carrier by splitting up the initial materials in the presence of the said catalyst mixtures on carriers, and by carrying out before or after this splitting up a thermal treatment, as the case may be, either of the initial materials or of the products in the presence of the said catalyst mixtures without carriers. Thereby the advantages of the working with carriers, that is to say, the attainment of a far-reaching splitting to low boiling substances, are connected with the advantages of the working without carriers, which consists in a practically complete removal of the phenols.

The products produced in the splitting stage of said multi-stage process may be freed prior to their further treatment from hydrocarbons of the boiling range of benzine. In case the treatment without carriers is the second stage of the process, it is advantageous to remove from the products of the first stage prior to the further treatment thereof only the constituents boiling below 160° or 180° C., as required, in order to attain a reduction of all phenols, which are contained in the light oils boiling above the said temperatures.

In many cases it is preferable to subject the initial materials before treatment in accordance with the present invention, e. g. before the first stage referred to in the foregoing paragraph to a prehydrogenation in the presence of a strongly hydrogenating acting catalyst, for example, of tungsten disulphide alone, for example, to remove diolefines, asphalts or the like. Hereby a smaller reaction vessel is applied with advantage than in the subsequent main reactions. The temperature in the prehydrogenation is usually maintained lower, for example, at between about 200° and 350° C.

The present invention is also very useful for the refining by treatment with hydrogen of impure liquid or fusible hydrocarbons. Such refining may also consist of or include the conversion of gum-forming or resinifying constituents by hydrogenation. These processes are often termed "hydrofining."

Said hydrofining is usually carried out at temperatures of between 300° and 500° C. and often with a high pressure of hydrogen under conditions that no substantial splitting occurs.

In refining hydrogenation the catalyst is usually stationarily contained in the reaction vessel. It may, however, be added in a finely divided state and in considerable concentrations, for example, in amounts of more than 5 per cent by weight of the initial material.

When employing initial materials of high boiling point or high asphalt content it is sometimes advisable to add diluents such as hydrogenated polynuclear compounds, for example tetra- or decahydronaphthalene, tar middle oils and the like.

Hydrofining with catalysts in accordance with the present invention may be employed with particular advantage as a preliminary treatment preceding a cracking or destructive hydrogenation, for example, with catalysts in accordance with the present invention or with other catalysts, for example, tungsten disulphide on Terrana, since then the yield of liquid products obtained in the conversion proper is increased, the yield of gaseous products decreased and soiling of the catalyst is avoided.

Also the present invention is very useful for improving or producing by hydroforming higher boiling hydrocarbons, such as lubricating oils.

The present invention may also be employed in the thermal treatment of hydrocarbons rich in hydrogen with hydrocarbons or bituminous substances poor in hydrogen, for example, in the conversion into knock-stable fuels of knocking motor fuels, say benzines obtained by conversion of oxides of carbon with hydrogen, if desired, at about atmospheric pressure with small amounts of tars, products obtained from coal by extraction under high pressure or the like.

The catalysts in accordance with the present invention may be employed in the pressure extraction of coal with or without hydrogen, usually in small amounts.

Also the catalysts may be employed in the thermal treatment of carbonaceous materials, such as hydrocarbon oils, with gaseous hydrocarbons, such as butane, propane and the like.

The following examples will further illustrate how the present invention may be carried out in practice but it should be understood that the invention is not limited to the Examples. The parts are by weight unless otherwise stated.

*Example 1*

A middle oil boiling from 200° to 325° C., obtained by destructive hydrogenation of bituminous coal, is passed at 495° C. together with hydrogen under a pressure of 250 atmospheres over a catalyst, which consists of an intimate mixture of 90 parts of ferrous sulphide and 10 parts of tungsten disulphide. The throughput amounts to 0.5 kilograms per liter of reaction space per hour.

Thereby a product is obtained, which contains besides 40 per cent of benzine, 60 per cent of middle oil. The latter is reintroduced into the reaction vessel. The benzine is free from phenols and sulphur, has an octane number of 89 and is an excellent knock-stable motor fuel which may also be employed for the improvement of other benzines. By distillation toluene can be obtained from the benzine in an amount of 12 per cent.

*Example 2*

A middle oil boiling from 200° to 325° C., which has been obtained by destructive hydrogenation of bituminous coal, is preheated in a coil and subjected to a preliminary hydrogenation in a high pressure vessel in the presence of tungsten disulphide at 225° C. under a pressure of 250 atmospheres of hydrogen. The products then pass into a second high pressure vessel where they are treated at 505° C. with hydrogen at 250 atmospheres. The second vessel contains a stationary catalyst, which consists of 80 parts of an active carbon prepared by activation with steam at 800° C., 12 parts of ferrous sulphide and 8 parts of tungsten disulphide. The constituents boiling up to 170° C., which are practically free from phenol, are distilled from the product obtained. The rest is subjected to destructive hydrogenation in a second stage in the presence of a catalyst, which consists of an intimate mixture of 80 parts of ferrous sulphide and 20 parts of tungsten disulphide, at 505° C. under a hydrogen pressure of 250 atmospheres. A further splitting up to benzine and a practically entire reduction of the phenols thus takes place. The benzine is distilled off and the middle oil reintroduced into the first stage.

The benzine fractions obtained in both stages are combined and therefrom the aromatic hydrocarbons are extracted with the aid of a mixture of liquid sulphur dioxide and propane at 80° below zero C. The hydrocarbons thus obtained are fractionated by fractional distillation and thus from 100 parts of the benzine mixture, 8 parts of benzene and 11 parts of toluene are obtained.

*Example 3*

A middle oil obtained by destructive hydrogenation of brown coal is heated up together with hydrogen under a pressure of 250 atmospheres in a gas heated preheater to 510° C. and then introduced from below into a tower-like vertical reaction vessel. This is filled to the extent of 80 per cent with a catalyst consisting of 80 parts of ferrous sulphide and 20 parts of molybdenum disulphide. The 20 per cent of reaction space remaining in the upper part of the vessel is filled with a catalyst mixture consisting of 80 parts of activated bleaching earth as a carrier and 12 parts of ferrous sulphide and 8 parts of tungsten sulphide. In this manner a reaction product is obtained, which to the extent of 52 per cent consists of hydrocarbons boiling up to 180° C.

The constituents of the reaction product boiling above 180° or 200° C., as desired, are reintroduced into the reaction vessel together with fresh initial material. Mixtures containing benzene, toluene and xylene are obtained, which can be employed as knock-stable motor fuels and from which benzene and benzene homologues can be isolated as such.

*Example 4*

A cracking residue boiling above 325° C. of mineral oil and containing 12 per cent of asphalt is passed together with hydrogen under a pressure of 600 atmospheres at 485° C. over a catalyst consisting of 90 per cent of ferrous sulphide and 10 per cent of tungsten disulphide. A product is obtained, which contains 12 per cent of knock-stable benzine, 33 per cent of Diesel oil with a cetene number of 50 and a solidifying point of 20° below zero C. The constituents boiling above 325° C., which contain less than 1 per cent of asphalt, are reintroduced into the reaction vessel together with fresh initial material.

*Example 5*

Middle oil which has been obtained by liquid phase hydrogenation under pressure of Iraq cracking residue is hydrofined by being passed together with hydrogen under a pressure of 250 atmospheres and at 350° C. over a catalyst consisting of 80 per cent of ferrous sulphide and 20 per cent of tungsten disulphide with a throughput such that substantially no benzine is formed. The middle oil which has been thus treated is then passed under a pressure of 250 atmospheres at 415° C. over a catalyst containing 10 per cent of tungsten disulphide deposited on Terrana bleaching earth which has been pretreated with hydrogen fluoride. The benzine thus obtained has an octane number of 69.5. Unconverted or insufficiently converted middle oil may be recycled.

If, by way of comparison, the initial material is passed direct over the said catalyst without pretreatment in accordance with the present invention only half the aforesaid amount of benzine is obtained per unit of time and the benzine has an octane number of only 62.

*Example 6*

Nickel carbonate and tungstic acid in the molecular proportion of 1:2 are made into a paste with water, dried, ground and converted into a mixture of sulphides by treatment with hydrogen sulphide at elevated temperature. The mixture of sulphides of nickel and tungsten thus obtained is intimately mixed with precipitated ferrous sulphide in the proportion of 15:85 parts by weight, pressed to pellets and these are filled into a reaction vessel.

The vapors of a heavy benzine which contain 15 per cent of phenols, 31 per cent of naphthenes, 32 per cent of aromatic hydrocarbons and neutral oil, and which has been obtained by the destructive hydrogenation of bituminous coal are passed over this catalyst at a temperature of 475° C. and under a pressure of 50 atmospheres together with hydrogen. A benzine is thus obtained which is practically free from phenols and which contains 15 per cent of naphthenes and 59 per cent of aromatic hydrocarbons. The octane number of the product is 88 as compared with 80 for the initial material.

*Example 7*

Iron sulphide is precipitated from a solution of ferrous sulphate by an addition of ammonium sulphide solution. The precipitate is filtered off, washed and dried in a current of hydrogen for several hours at a temperature gradually rising to 400° C. 90 parts by weight of the sulphide thus obtained are impregnated with a solution of 14 parts by weight of ammonium thio-tungstate in aqueous ammonium sulphide and the product dried for several hours in a current of hydrogen at a temperature rising up to 400° C. The catalyst is then formed to pieces of suitable shape and the pieces are filled into a high pressure reaction vessel.

Over this catalyst a cracking residue which contains 5.3 per cent of constituents boiling up to 325° C. and in the part boiling above 325° C. 5 per cent of asphalt is passed at a temperature of 475° C. together with hydrogen under a pressure of 600 atmospheres.

The product obtained contains 53 per cent of constituents boiling up to 325° C. and 0.2 per cent of asphalt in the residue.

*Example 8*

A solution of 33 grams of ammonium thiomolybdate in 500 cubic centimeters of an ammonium sulphide solution of a strength of 15 per cent is poured into an aqueous solution of 250 grams of ferrous sulphate while stirring. The black precipitate of iron sulphide and iron thiomolybdate formed thereby is separated by filtration, washed, dried while excluding air and heated to 400° C. together with hydrogen to which about 20 per cent of hydrogen sulphide is admixed. After cooling the catalyst thus obtained which contains 80 parts of iron sulphide and 20 parts of molybdenum sulphide is pressed into pills.

If over this catalyst the vapors of a middle oil obtained from the cracking residues of an American asphalt base oil by destructive hydrogenation in the liquid phase and having a cetene number of 20 are passed together with hydrogen at 440° C. under a pressure of 250 atmospheres, a Diesel oil is obtained with a cetene number of 50.

*Example 9*

A solution of 20 grams of tungstic acid in 250 cubic centimeters of ammoniacal water of a strength of 20 per cent is added to an aqueous solution of 246 grams of crystalline ferric chloride while stirring and thereupon further amounts of ammoniacal water are added until the complete precipitation of the iron. The obtained precipitate consisting of iron hydroxide and iron tungstate is separated by filtration and converted into a mixture of sulphides by treatment with hydrogen sulphide at 400° C.

If over this catalyst the vapors of a middle oil boiling between 200° and 325° C. and which has been obtained by destructive hydrogenation of bituminous coal are passed together with hydrogen under a pressure of 250 atmospheres at 505° C., 35 per cent of benzine and 65 per cent of middle oil are obtained of which the latter is further split in the reaction vessel to benzine. The octane number of the benzine amounts to 88.

What we claim is:

1. A process for the production of hydrocarbons which comprises subjecting carbonaceous materials containing more than one carbon atom in the molecule to a thermal treatment to produce products having a number of carbon atoms in the molecule which is not greater than that of the initial material at a temperature ranging from 180 to 700° C. in the presence of a mixed catalyst containing a component $a$ consisting of at least one metal of a weakly hydrogenating action selected from the class consisting of iron and zinc in the form of a preformed compound of sulphur, and a component $b$ consisting of at least one substance of a strongly hydrogenating action selected from the group consisting of the metals molybdenum, tin, tungsten, rhenium, uranium, vanadium, chromium, nickel and cobalt and compounds thereof, said component $a$ being present in an amount of 97 to 60 parts by weight and said component $b$ being present in an amount of 3 to 40 parts by weight.

2. A process as claimed in claim 1 which comprises using as catalysts a mixture of components $a$ and $b$ obtained by mixing of at least two of the substances serving as initial materials for the preparation of the catalyst and converting this mixture into the desired catalytic substances.

3. A process as claimed in claim 1 which comprises using as catalysts a mixture of components $a$ and $b$ obtained by impregnating the weakly hydrogenating component $a$ with a solution of a suitable proportion of the strongly hydrogenating component $b$.

4. A process as claimed in claim 1 which comprises using as catalysts a mixture of components $a$ and $b$ wherein at least the component $b$ is supported on a carrier.

5. The process as claimed in claim 1 applied to the hydrogenation of carbonaceous materials containing more than one carbon atom in the molecule.

6. The process as claimed in claim 1 applied to the cracking of carbonaceous materials containing more than one carbon atom in the molecule.

7. The process as claimed in claim 1 applied to the thermal treatment of carbonaceous material containing asphalt.

8. The process as claimed in claim 1 applied to the thermal treatment of initial materials poor in hydrogen obtained by separation from a mixture of components rich in hydrogen and components poor in hydrogen with the aid of selective solvents.

9. The process as claimed in claim 1 applied to the hydrogenation of carbonaceous material containing asphalt using as catalysts a mixture of components $a$ and $b$ obtained by mixing of at least two of the substances serving as initial materials for the preparation of the catalysts and converting this mixture into the desired catalytic substances.

10. The process as claimed in claim 1 applied to the hydrogenation of initial materials poor in hydrogen obtained by separation from a mixture of components rich in hydrogen and components poor in hydrogen with the aid of selective solvents using as catalysts a mixture of components $a$ and $b$ wherein at least the component $b$ is supported on a carrier.

11. The process as claimed in claim 1 applied to the cracking of carbonaceous materials containing more than one carbon atom in the molecule using as catalysts a mixture of components $a$ and $b$ obtained by impregnating the weakly hydrogenating component $a$ with a solution of a minor proportion of the strongly hydrogenating component $b$.

12. The process as claimed in claim 1 applied to the destructive hydrogenation of carbonaceous materials containing more than one carbon atom in the molecule.

13. The process as claimed in claim 1 in which the said component $a$ is a preformed sulfur compound of iron.

MATHIAS PIER.
WALTER SIMON.
PAUL JACOB.
RUDOLF BECKER.